United States Patent
Koshikawa (10) Patent No.: US 12,145,378 B2
(45) Date of Patent: Nov. 19, 2024

(54) LIQUID EJECTION APPARATUS

(71) Applicant: CANON KABUSHIKI KAISHA, Tokyo (JP)

(72) Inventor: Hiroshi Koshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 17/966,509

(22) Filed: Oct. 14, 2022

(65) Prior Publication Data

US 2023/0135411 A1    May 4, 2023

(30) Foreign Application Priority Data

Oct. 28, 2021   (JP) .................... 2021-176496

(51) Int. Cl.
  *B41J 2/175*    (2006.01)
  *G01F 23/76*    (2006.01)

(52) U.S. Cl.
  CPC .......... *B41J 2/17566* (2013.01); *G01F 23/76* (2013.01); *B41J 2002/17576* (2013.01)

(58) Field of Classification Search
  CPC .................... G01F 23/76; B41J 2002/17576
  See application file for complete search history.

(56) References Cited

U.S. PATENT DOCUMENTS

| | | |
|---|---|---|
| 6,293,663 B1 | 9/2001 | Koshikawa et al. |
| 6,350,025 B1 | 2/2002 | Morita et al. |
| 6,382,783 B1 | 5/2002 | Hayashi et al. |
| 6,390,601 B1 | 5/2002 | Morita et al. |
| 6,402,298 B1 | 6/2002 | Nanjo et al. |
| 6,443,567 B1 | 9/2002 | Hayashi et al. |
| 6,450,631 B1 | 9/2002 | Hayashi et al. |
| 6,454,400 B1 | 9/2002 | Morita et al. |
| 6,471,343 B1 | 10/2002 | Shimizu et al. |
| 6,505,923 B1 | 1/2003 | Yamamoto et al. |
| 6,511,167 B1 | 1/2003 | Kitabatake et al. |
| 6,530,654 B2 | 3/2003 | Kitabatake et al. |
| 6,540,342 B2 | 4/2003 | Koshikawa et al. |
| 6,543,886 B1 | 4/2003 | Hattori et al. |
| 6,550,898 B2 | 4/2003 | Hayashi et al. |
| 6,598,963 B1 | 7/2003 | Yamamoto et al. |
| 6,655,542 B2 | 12/2003 | Koshikawa et al. |
| 6,702,427 B2 | 3/2004 | Shimizu et al. |
| 6,705,715 B2 | 3/2004 | Morita et al. |

(Continued)

FOREIGN PATENT DOCUMENTS

JP    2019-025818    2/2019

OTHER PUBLICATIONS

U.S. Appl. No. 17/955,021, filed Sep. 28, 2022.

*Primary Examiner* — Julian D Huffman
(74) *Attorney, Agent, or Firm* — Venable LLP (57) ABSTRACT

There is provided a technique that enables correct detection of the remaining amount of liquid such as ink. A liquid ejection apparatus has a liquid ejection head which ejects a supplied liquid, a storage unit which stores a liquid to be supplied to the liquid ejection head, a pivot member which is immersed in a liquid stored in the storage unit and is pivotally movable according to an amount of the liquid, and a detection unit which detects the amount of the liquid using the pivot member, wherein at least one of a specific gravity and size of the pivot member differs according to a specific gravity of a liquid stored in the storage unit.

11 Claims, 6 Drawing Sheets

(56) References Cited

U.S. PATENT DOCUMENTS

| | | |
|---|---|---|
| 6,709,092 B2 | 3/2004 | Hayashi et al. |
| 6,712,458 B2 | 3/2004 | Hatasa et al. |
| 6,719,415 B1 | 4/2004 | Hattori et al. |
| 6,742,857 B2 | 6/2004 | Koshikawa et al. |
| 6,796,645 B2 | 9/2004 | Hayashi et al. |
| 6,805,434 B2 | 10/2004 | Hayashi et al. |
| 6,824,258 B2 | 11/2004 | Yamamoto et al. |
| 6,851,798 B2 | 2/2005 | Koshikawa et al. |
| 6,863,762 B2 | 3/2005 | Sanada et al. |
| 6,877,848 B2 | 4/2005 | Shimizu et al. |
| 6,921,161 B2 | 7/2005 | Morita et al. |
| 9,333,758 B2 | 5/2016 | Koshikawa et al. |
| 9,597,884 B2 | 3/2017 | Nanjo et al. |
| 9,821,562 B2 | 11/2017 | Nanjo et al. |
| 9,840,082 B2 | 12/2017 | Nanjo et al. |
| 9,908,338 B2 | 3/2018 | Koshikawa et al. |
| 10,207,511 B2 | 2/2019 | Nanjo et al. |
| 10,618,293 B2 | 4/2020 | Koshikawa et al. |
| 10,994,548 B2 | 5/2021 | Iinuma et al. |
| 11,472,191 B2 | 10/2022 | Takei et al. |
| 2003/0038867 A1 | 2/2003 | Yamamoto et al. |
| 2019/0030910 A1 | 1/2019 | Tanabe et al. |
| 2021/0300055 A1 | 9/2021 | Koshikawa et al. |
| 2022/0266599 A1* | 8/2022 | Minamikawa ....... B41J 2/17523 |
| 2023/0001701 A1 | 1/2023 | Takei et al. |

\* cited by examiner

LIQUID EJECTION APPARATUS

BACKGROUND OF THE INVENTION

Field of the Invention

The present invention relates to a liquid ejection apparatus universally applicable as, for example, an inkjet printing apparatus comprising a print head capable of ejecting ink under an inkjet system.

Description of the Related Art

Japanese Patent Laid-Open No. 2019-25818 discloses a technique of including a member comprising a float in a storage chamber storing ink such that the member is pivotally movable and detecting the pivot motion of the member with a sensor, thereby detecting the remaining amount of ink in the storage chamber. According to the technique disclosed in Japanese Patent Laid-Open No. 2019-25818, a buoyancy exerted on a float by a stored ink is used to pivot the pivot member depending on the remaining amount of ink. In order to exert the buoyancy on the float, the specific gravity of the float is designed to be lower than the specific gravity of the stored ink.

Incidentally, in a printing apparatus which ejects multiple types of inks, the storage chamber disclosed in Japanese Patent Laid-Open No. 2019-25818 is provided for each of the inks. The buoyancy exerted on the float differs according to the specific gravity of an ink. Thus, in the case of using multiple types of inks which have specific gravities greater than that of the float and different from one another, the buoyancy exerted on the float varies according to whether an ink has a high or low specific gravity. Hence, the amount of pivot motion of the pivot member corresponding to the remaining amount of ink differs according to the type of ink, which may inhibit correct detection of the remaining amount of ink.

SUMMARY OF THE INVENTION

The present invention has been accomplished in consideration of the above problem and provides a technique that enables correct detection of the remaining amount of liquid such as ink.

In the first aspect of the present invention, there is provided a liquid ejection apparatus including:

a liquid ejection head configured to eject a liquid; and
a plurality of storage units configured to store a liquid to be supplied to the liquid ejection head, each of the storage units comprising:

a pivot member immersed in a stored liquid and pivotally movable according to an amount of the liquid; and
a detection unit configured to detect an amount of the liquid stored in the storage unit using the pivot member, wherein at least one of a specific gravity and size of the pivot member comprised in each of the storage units differs according to a specific gravity of a liquid stored in each of the storage units.

According to the present invention, the remaining amount of ink can be correctly detected.

Further features of the present invention will become apparent from the following description of exemplary embodiments with reference to the attached drawings.

DESCRIPTION OF THE EMBODIMENTS

An example of a liquid ejection apparatus according to the present invention will be hereinafter described in detail with reference to the accompanying drawings. It should be noted that the embodiments described below do not limit the present invention and not all combinations of features described in the embodiments are necessarily essential for solving the problem to be solved by the present invention. Further, the relative positions, shapes, and the like of constituents described in the embodiments are merely shown as examples unless otherwise specified and are not intended to limit the scope of the invention to these examples.

First Embodiment

Figure 1A:
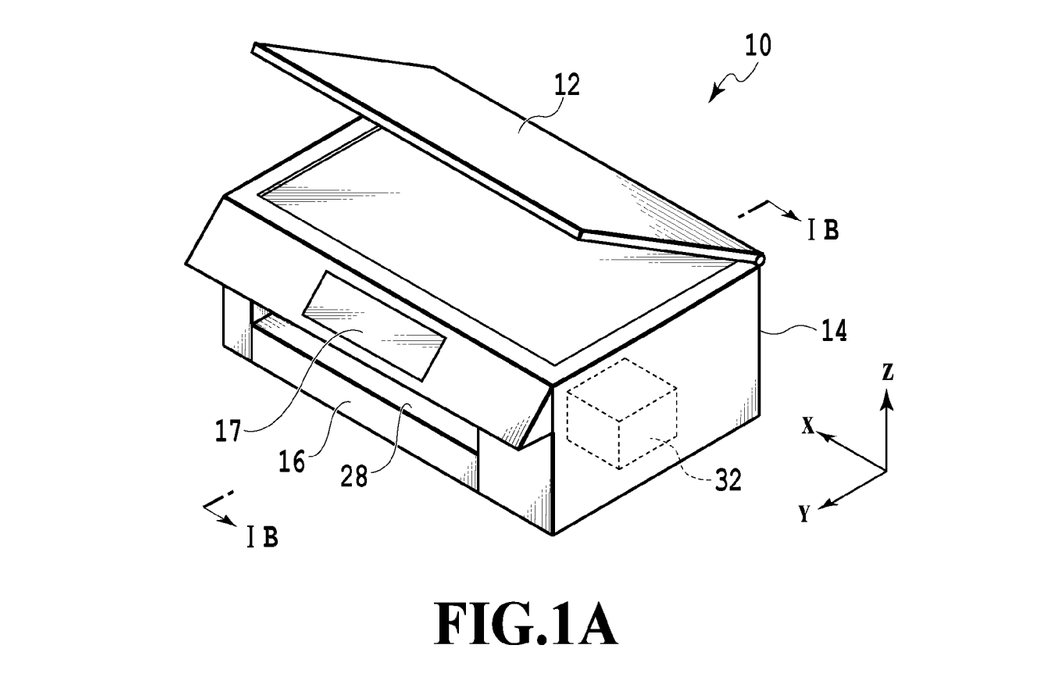
FIGS. 1A and 1B are schematic diagrams of a configuration of a printing apparatus as an example of a liquid ejection apparatus according to an embodiment.
Figure 1B:
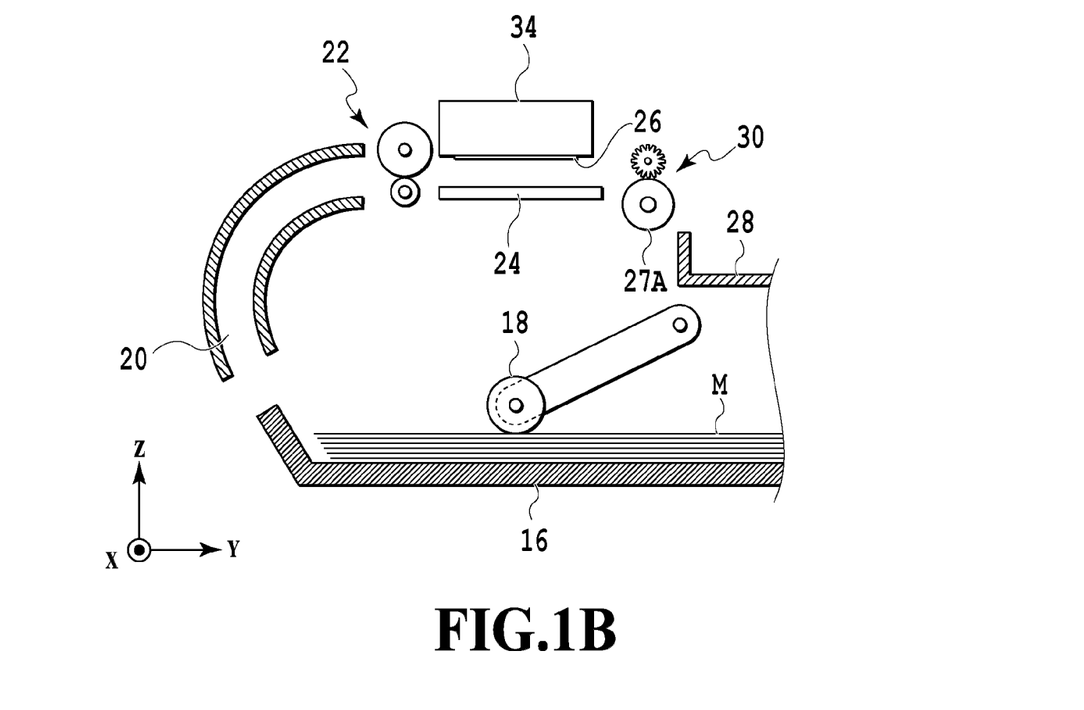

First, a liquid ejection apparatus according to a first embodiment will be described with reference to FIGS. 1A to 5B. An example of the liquid ejection apparatus described herein is a printing apparatus which performs printing by ejecting ink to a print medium. FIGS. 1A and 1B are diagrams schematically illustrating the printing apparatus according to the embodiment; FIG. 1A is a perspective view of an appearance of the apparatus and FIG. 1B is a diagram showing a configuration of a printing portion inside the apparatus. It should be noted that the printing apparatus 10 of FIGS. 1A and 1B is an example of the printing apparatus to which the present embodiment is applicable; the printing apparatus to which the present embodiment is applicable is not limited to the printing apparatus 10 shown in FIGS. 1A and 1B.

The printing apparatus 10 shown in FIGS. 1A and 1B is a so-called multifunction peripheral comprising a reading portion 12 capable of reading a document set on a document plate and a printing portion 14 which performs printing on a print medium based on information read by the reading portion 12, information input from an external apparatus, or the like.

The reading portion 12 is located at the top of the printing apparatus 10 and the printing portion 14 is located at the bottom of the printing apparatus 10. The printing portion 14 comprises an accommodating tray 16 which accommodates a print medium M, a feeding roller 18 which feeds the print medium M accommodated in the accommodating tray 16, and a guide portion 20 which guides the fed print medium M to a position of printing by a print head 26 (described later). The printing portion 14 also comprises a conveying roller 22 which conveys the print medium M fed through the guide portion 20, a platen 24 which supports the print medium M conveyed by the conveying roller 22, and the print head 26 which ejects ink to the print medium M supported by the platen 24. The printing portion 14 further comprises a discharge roller 30 which discharges the printed print medium M to a discharge tray 28 and an ink storage portion 32 as a storage unit to store an ink to be supplied to the print head 26 through a tube (not shown).

The print head 26 may be configured to eject inks of a plurality of colors or eject only an ink of a single color. The print head 26 may also be configured to eject a processing liquid to give a predetermined effect to an image after printing. In a case where multiple types of inks (including a processing liquid) are ejected, a plurality of ink storage portions 32 are provided to store the different types of inks. The print head 26 is mounted on a carriage 34. The carriage 34 is configured to move reciprocally in an X direction. The print medium M accommodated in the accommodating tray 16 is conveyed in a −Y direction by the feeding roller 18, turned around by the guide portion 20, and conveyed in a +Y direction by the conveying roller 22.

In the printing apparatus 10, the print head 26 performs a print operation of ejecting ink to the print medium M supported by the platen 24 while moving in the X direction via the carriage 34 to make print corresponding to a single scan on the print medium M. Next, a conveyance operation is performed by conveying the print medium by a predetermined amount in the +Y direction to locate an area of the print medium M on which no print is made at a position facing the print head 26. After that, the print operation is performed again. In this manner, the printing apparatus 10 alternately repeats the print operation and the conveyance operation, thereby printing an image on the print medium M.

Figure 2A:
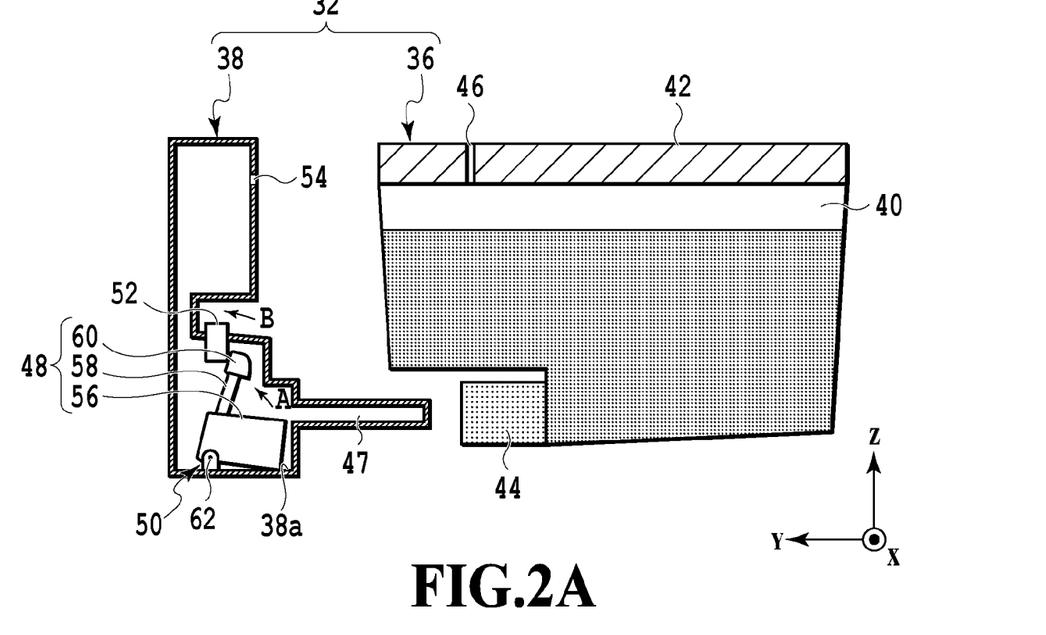
FIGS. 2A and 2B are diagrams showing a motion of a pivot member in a case where an ink storage chamber is supplied with ink.
Figure 2B:
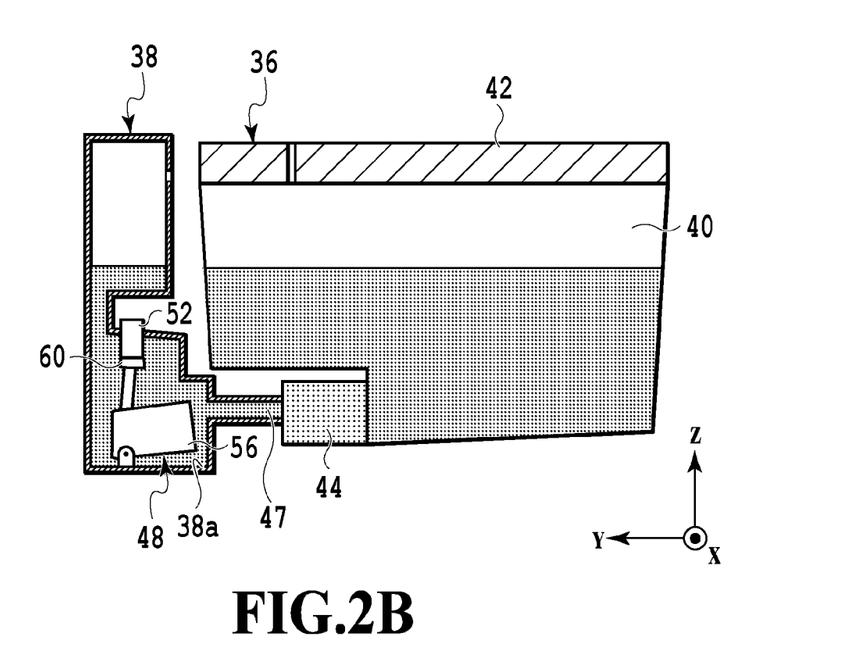

FIGS. 2A and 2B are schematic configuration diagrams of the ink storage portion 32; FIG. 2A shows a state in which the ink accommodating member 36 is not yet mounted on the ink storage chamber 38 and FIG. 2B shows a state in which the ink accommodating member 36 has been mounted on the ink storage chamber 38.

The ink storage portion 32 comprises an ink accommodating member 36 which accommodates ink and an ink storage chamber 38 which stores the ink accommodated in the ink accommodating member 36. The ink accommodating member 36 is attachable to and detachable from the ink storage chamber 38. In the printing apparatus 10, in a case where the remaining amount of ink in the ink storage chamber 38 reaches a certain amount, a user makes a replacement with a new ink accommodating member 36.

The ink storage portion 32 is provided for each type of ink ejected from the print head 26. Incidentally, the ink storage portions 32 have the same configuration irrespective of the type of ink except for part of the configuration of a pivot member 48 (described later). In the ink storage portion 32, ink stored in the ink storage chamber 38 is supplied to the print head 26 through the tube (not shown). In a case where the ink is supplied from the ink storage chamber 38 to the print head 26 and the amount of ink is reduced in the ink storage chamber 38, the ink storage chamber 38 is supplied with ink from the connected ink accommodating member 36.

The ink accommodating member 36 comprises a main body portion 40 and a lid portion 42. The main body portion 40 accommodates ink therein. The bottom of the main body portion 40 is provided with a supply portion 44 connected to a connecting member 47 (described later) in the ink storage chamber 38 and capable of supplying ink to the ink storage chamber 38. That is, in the present embodiment, the ink accommodating member 36 is attachable to and detachable from the ink storage chamber 38 via the supply portion 44. The supply portion 44 comprises an open/close mechanism such as a valve spring structure. In the lid portion 42 is formed an air communication port 46 which allows communication between the inside and outside of the ink accommodating member 36.

The ink storage chamber 38 comprises the connecting member 47 connected to the ink accommodating member 36 via the supply portion 44. The pivot member 48 is provided at a bottom 38a in the ink storage chamber 38. The pivot member 48 is pivotally supported by the support member 50 at the bottom 38a. Accordingly, in a case where the ink storage chamber 38 is supplied with ink, the pivot member 48 is immersed in the ink. In the ink storage chamber 38, a sensor 52 capable of detecting the pivot motion of the pivot member 48 is also provided above the pivot member 48. Incidentally, the sensor 52 is provided in the ink storage chamber 38 but is not limited to this and may be provided separately from the ink storage chamber 38 as long as the pivot motion of the pivot member 48 can be detected. In the ink storage chamber 38, an air communication port 54 which allows communication between the inside and outside of the ink storage chamber 38 is formed at a position not reached by a liquid surface of the stored ink.

The pivot member 48 comprises a float 56 which extends in the Y direction, an arm portion 58 which extends upward (substantially in a Z direction) from the float 56, and a detection target portion 60 located at the end of the arm portion 58. The float 56 is formed of a material lower in specific gravity than an ink stored in the ink accommodating member 36. The float 56 is pivotally supported by a shaft 62 extending in the X direction in the support member 50 at the bottom of one side in the extending direction (Y direction). The detection target portion 60 is located above the float 56 via the arm portion 58. Thus, the detection target portion 60 is movable according to the pivot motion of the float 56. The detection target portion 60 is formed of a material detectable by the sensor 52. Incidentally, as will be described later, since the sensor 52 of the present embodiment is an optical sensor comprising a light emitting portion and a light receiving portion, the detection target portion 60 is formed of a material which shields or attenuates light from the light emitting portion.

The sensor 52 is a detection unit which detects the pivot motion of the pivot member 48 and thereby optically detects that the height of the liquid surface of the ink stored in the ink storage chamber 38 becomes lower than a predetermined position. In a case where the height of the liquid surface of the ink becomes lower than the predetermined position, the printing apparatus 10 determines that the ink stored in the ink storage chamber 38 becomes equal to or less than a predetermined amount. More specifically, the sensor 52 comprises a light emitting portion (not shown) and a light receiving portion (not shown). In FIGS. 2A and 2B, the light emitting portion and the light receiving portion are arranged so as to face each other with an interval in the X direction. In a case where the pivot member 48 pivots, the detection target portion 60 passes between the light emitting portion and the light receiving portion. The sensor 52 outputs a detection signal which differs according to reception of light output from the light emitting portion by the light receiving portion.

More specifically, for example, in a case where light output from the light emitting portion cannot be received by the light receiving portion, that is, in a case where a received light intensity is less than a predetermined intensity, the sensor 52 outputs a low-level signal indicating a signal having a signal level lower than a threshold level. The output low-level signal is accepted by a control portion (not shown)

mounted on a main board (not shown). On acceptance of the low-level signal, the control portion detects that the height of the liquid surface of the ink is equal to or higher than the predetermined position.

On the other hand, in a case where light output from the light emitting portion can be received by the light receiving portion, that is, in a case where a received light intensity is equal to or greater than a predetermined intensity, the sensor 52 outputs a high-level signal indicating a signal having a signal level equal to or higher than a threshold level. The output high-level signal is accepted by the control portion and the control portion detects that the height of the liquid surface of the ink is lower than the predetermined position.

In a case where the ink accommodating member 36 is connected to the connecting member 47 of the ink storage chamber 38 with no ink stored (see FIG. 2A) via the supply portion 44, ink in the ink accommodating member 36 flows into the ink storage chamber 38 through the supply portion 44 and the connecting member 47. In a case where a certain amount of ink is stored in the ink storage chamber 38, the buoyancy acting on the float 56 lower in specific gravity than the ink exceeds the gravity and the pivot member 48 (float 56) pivots in an arrow A direction. This pivot motion of the pivot member 48 in the arrow A direction moves the detection target portion 60 in an arrow B direction.

In a case where ink further flows in and the height of the liquid surface of the ink thereby becomes equal to or higher than the predetermined position in the ink storage chamber 38, the detection target portion 60 moves in the arrow B direction to a position between the light emitting portion and light receiving portion of the sensor 52. The height of the liquid surface of the ink being equal to or higher than the predetermined position in the ink storage chamber 38 means that a predetermined amount or more of ink is stored in the ink storage chamber 38. Incidentally, while the height of the liquid surface of the ink is equal to or higher than the predetermined position, the detection target portion 60 remains in between the light emitting portion and the light receiving portion (see FIG. 2B). As stated above, in a case where the height of the liquid surface of the ink is equal to or higher than the predetermined position, since light output from the light emitting portion is prevented from being received by the light receiving portion (or attenuated before reaching the light receiving portion) by the detection target portion 60, the sensor 52 outputs a low-level signal to the control portion. The control portion thus detects that the height of the liquid surface of the ink is equal to or higher than the predetermined position.

Figure 3A:
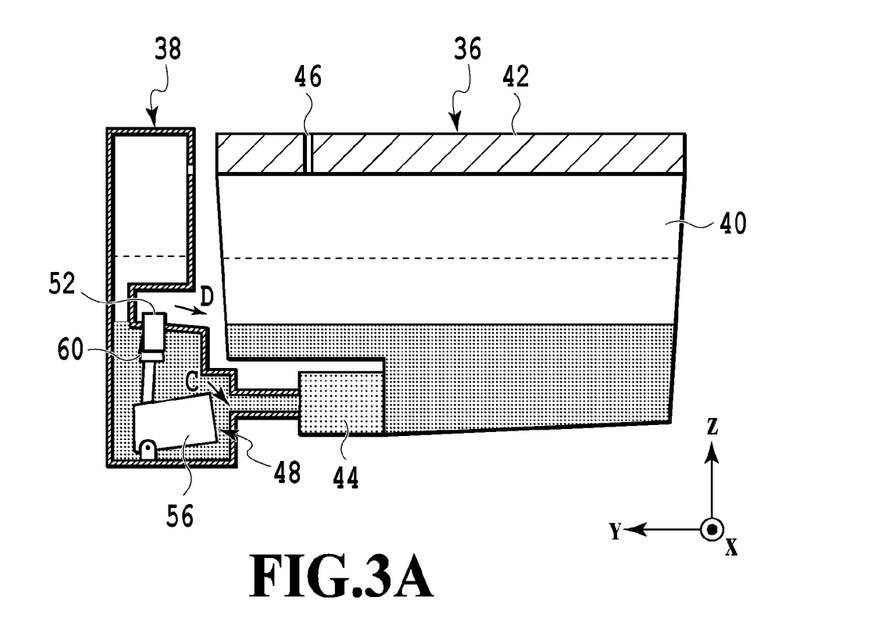
FIGS. 3A and 3B are diagrams showing a motion of the pivot member in a case where the stored ink is reduced in the ink storage chamber.
Figure 3B:
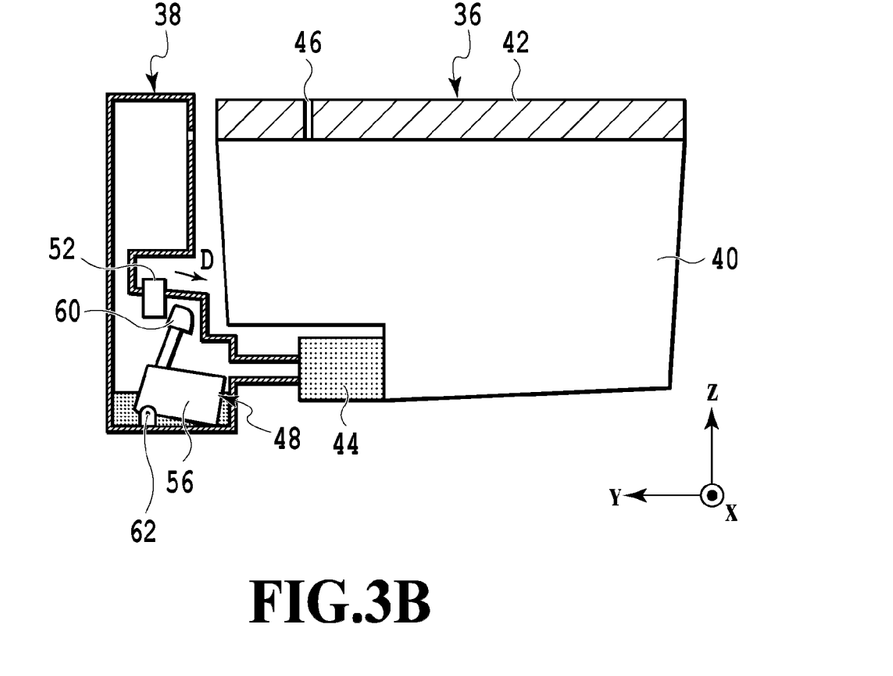

FIGS. 3A and 3B are diagrams illustrating a motion of the pivot member 48 in a case where ink is reduced in the ink storage chamber 38. FIG. 3A is a diagram showing the pivot member 48 in a case where the liquid surface of the ink in the ink storage chamber 38 is equal to or higher than the predetermined position. FIG. 3B is a diagram showing the pivot member 48 in a case where the liquid surface of the ink in the ink storage chamber 38 is lower than the predetermined position.

Ink is supplied from the ink storage chamber 38 to the print head 26, whereby ink is reduced in the ink storage chamber 38 and the ink accommodating member 36 and the liquid surface of the ink is lowered in the ink storage chamber 38 (see FIG. 3A). In a case where the amount of ink is reduced in the ink storage chamber 38 and the stored ink becomes less than a certain amount, the gravity exceeds the buoyancy acting on the float 56. This causes the pivot member 48 (float 56) to pivot in an arrow C direction. This pivot motion of the pivot member 48 in the arrow C direction moves the detection target portion 60 in an arrow D direction.

In a case where the print head 26 is further supplied with ink and the height of the liquid surface of the ink thereby becomes lower than the predetermined position in the ink storage chamber 38, the detection target portion 60 moves in the arrow D direction to a position away from between the light emitting portion and light receiving portion of the sensor 52. Incidentally, while the height of the liquid surface of the ink is lower than the predetermined position, the target portion 60 remains at the position away from between the light emitting portion and light receiving portion, that is, stays away from the sensor 52 (see FIG. 3B). Accordingly, in case where the height of the liquid surface of the ink is lower than the predetermined position, since light output from the light emitting portion can be received by the light receiving portion (or can reach the light receiving portion without attenuation), the sensor 52 outputs a high-level signal to the control portion. The control portion thus detects that the height of the liquid surface of the ink is lower than the predetermined position.

In the printing apparatus 10, at the time of detecting that the height of the liquid surface of the ink becomes lower than the predetermined position, for example, a display portion 17 (see FIG. 1A) provided in the printing apparatus 10 makes a notification to prompt a user to replace the ink accommodating member 36. A user generally checks the notification displayed on the display portion 17 and replaces the ink accommodating member 36. However, a small amount of ink still remains in the ink storage chamber 38 and a certain number of sheets can be printed even after it is detected that the height of the liquid surface of the ink becomes lower than the predetermined position. Thus, the printing apparatus 10 counts the number of ink droplets ejected from the time of detecting that the height of the liquid surface of the ink becomes lower than the predetermined position and notifies that ink has run out at the timing when it becomes likely that ink cannot be supplied from the ink storage chamber 38 to the print head 26.

Incidentally, in recent years, types of inks for use in a printing apparatus have been used in multiple ways and a single printing apparatus has been configured to use multiple types of inks. Accordingly, in a case where the printing apparatus comprises a plurality of ink storage portions 32 completely identical in configuration for respective inks, some inks may be different in specific gravity, which may make a difference in buoyancy acting on the float. As a result, it may be impossible to correctly detect that the height of the liquid surface of ink becomes lower than the predetermined position.

Figure 4A:
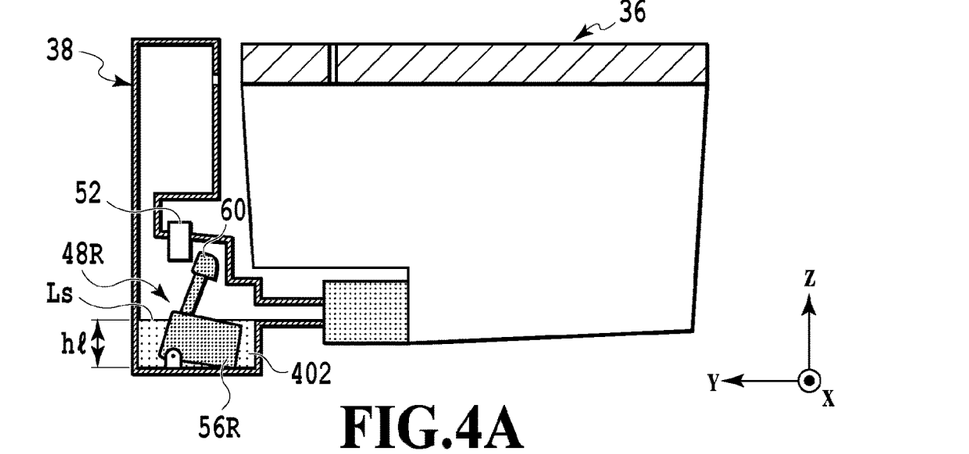
FIGS. 4A to 4C are diagrams showing heights of ink liquid surfaces in a case where the remaining amounts of inks different in specific gravity are determined to be equal to or less than a predetermined amount.
Figure 4B:
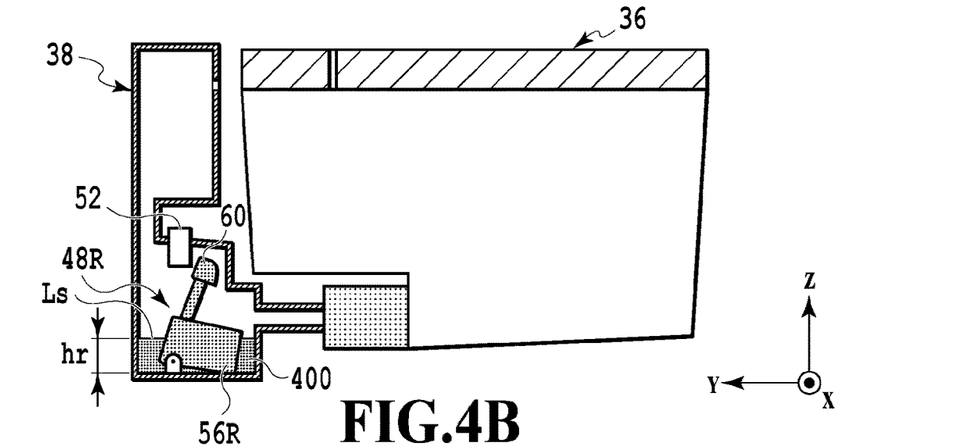
Figure 4C:
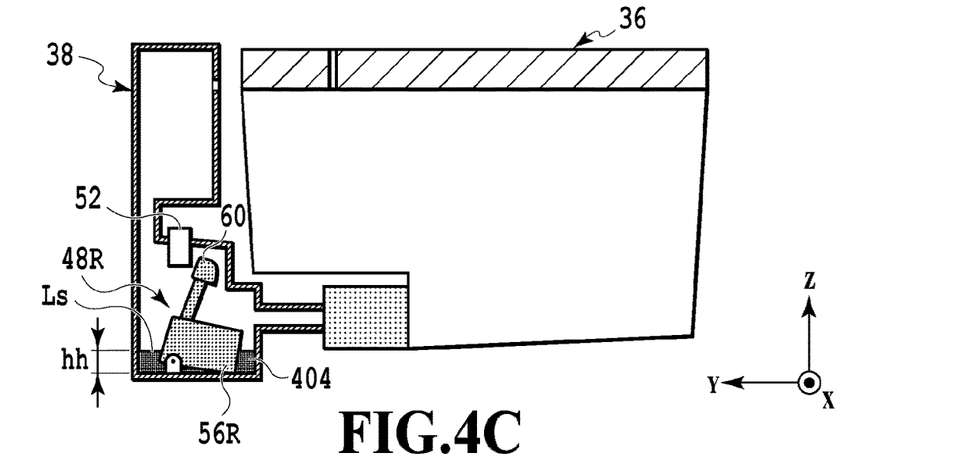

It will be explained in detail with reference to FIGS. 4A to 4C that a difference in specific gravity between inks makes it impossible to correctly detect that the height of the liquid surface of ink becomes lower than the predetermined position. FIGS. 4A to 4C are diagrams showing differences in the state of the pivot member and the remaining amount of ink in the case of using inks different in specific gravity. FIG. 4A shows the case of using an ink having a specific gravity a certain amount less than a reference specific gravity. FIG. 4B shows the case of using an ink having the reference specific gravity. FIG. 4C shows the case of using an ink having a specific gravity a certain amount greater than the reference specific gravity. Incidentally, the pivot member is a pivot member 48R having such a specific gravity that in the case of using a reference ink 400, it can be correctly detected that the height of the liquid surface of the ink 400 in the ink storage chamber 38 becomes lower than the predetermined position. The specific gravity of the pivot member 48R is less than a specific gravity of an ink 402, which is a certain amount less than that of the reference ink 400.

In the case of using the ink 400 having the reference specific gravity, if a liquid surface Ls of the ink 400 reaches a height hr in the ink storage chamber 38, the detection target portion 60 of the pivoting pivot member 48R gets away from the sensor 52 (see FIG. 4B). At this time, the printing apparatus 10 detects that the height of the liquid surface of the ink becomes lower than the predetermined position. That is, in this case, the buoyancy exerted on the pivot member 48R is less than the gravity acting on the pivot member 48R at the height hr.

In the case of using the ink 402 having the specific gravity lower than the reference specific gravity of the ink 400, if the liquid surface Ls of the ink 402 reaches a height hl in the ink storage chamber 38, the detection target portion 60 of the pivoting pivot member 48R gets away from the sensor 52 (see FIG. 4A). That is, the buoyancy exerted on the pivot member 48R (float 56R) is less than the gravity acting on the pivot member 48R at the height hl higher than the height hr. Accordingly, the printing apparatus 10 detects that the height of the liquid surface of the ink becomes lower than the predetermined position in a case where the liquid surface Ls reaches the height hl. The ink 402 is lower in specific gravity than the ink 400. Thus, in the ink storage chamber 38, the buoyancy exerted on the pivot member 48R (float 56R) by the ink 402 is less than the buoyancy exerted on the pivot member 48R by the ink 400. As a result, in a case where the liquid surface height reaches the height hl at which a greater amount of ink remains, the detection target portion 60 gets away from the sensor 52.

In the case of using an ink 404 having a specific gravity higher than the reference specific gravity of the ink 400, if the liquid surface Ls of the ink 404 reaches a height hh in the ink storage chamber 38, the detection target portion 60 of the pivoting pivot member 48R gets away from the sensor 52 (see FIG. 4C). That is, the buoyancy exerted on the pivot member 48R is less than the gravity acting on the pivot member 48R at the height hh lower than the height hr. Thus, in a case where the liquid surface Ls reaches the height hh, the printing apparatus 10 detects that the height of the liquid surface of the ink becomes lower than the predetermined position. The ink 404 is higher in specific gravity than the ink 400. Thus, in the ink storage chamber 38, the buoyancy exerted on the pivot member 48R by the ink 404 is greater than the buoyancy exerted on the pivot member 48R by the ink 400. As a result, in a case where the liquid surface height reaches the height hh at which a less amount of ink remains, the detection target portion 60 gets away from the sensor 52.

As explained above, in a case where the ink storage chambers 38 of the same configuration comprising the pivot member 48R are used for the inks different in specific gravity, the liquid surface height at which it is detected that the liquid surface becomes lower than the predetermined position, that is, the liquid surface height at which the detection target portion 60 gets away from the sensor 52, differs according to the specific gravity of an ink. The printing apparatus 10 is configured to count the number of ink droplets ejected after making a notification to prompt replacement of the ink accommodating member 36 and, in a case where the count reaches a predetermined number, notify that the ink has run out. Accordingly, there is a possibility that the ink runs out before the timing of notifying that the ink has run out or a printable amount of ink still remains even at that timing.

Figure 5A:
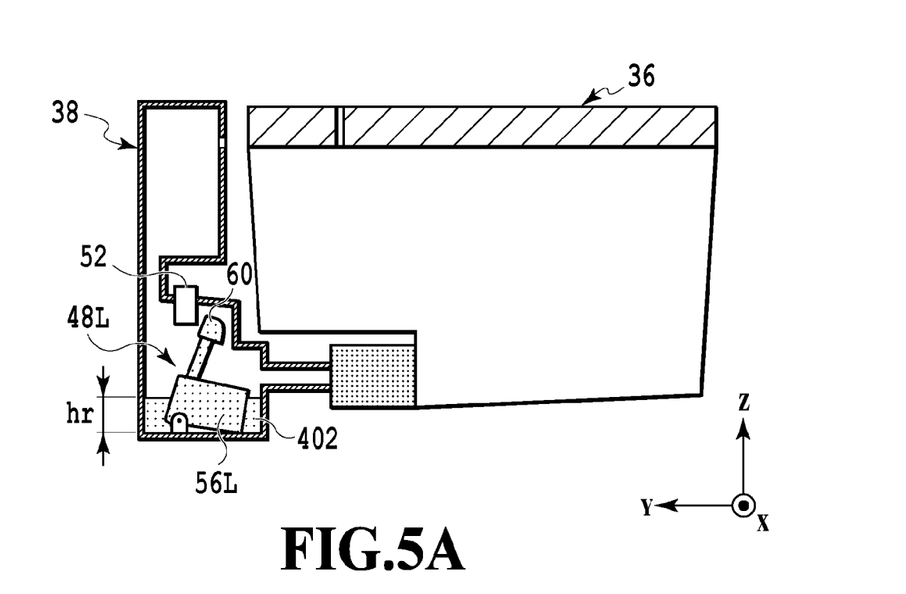
FIGS. 5A and 5B are diagrams showing pivot members to provide a constant liquid surface height of an ink according to the specific gravity of the ink.
Figure 5B:
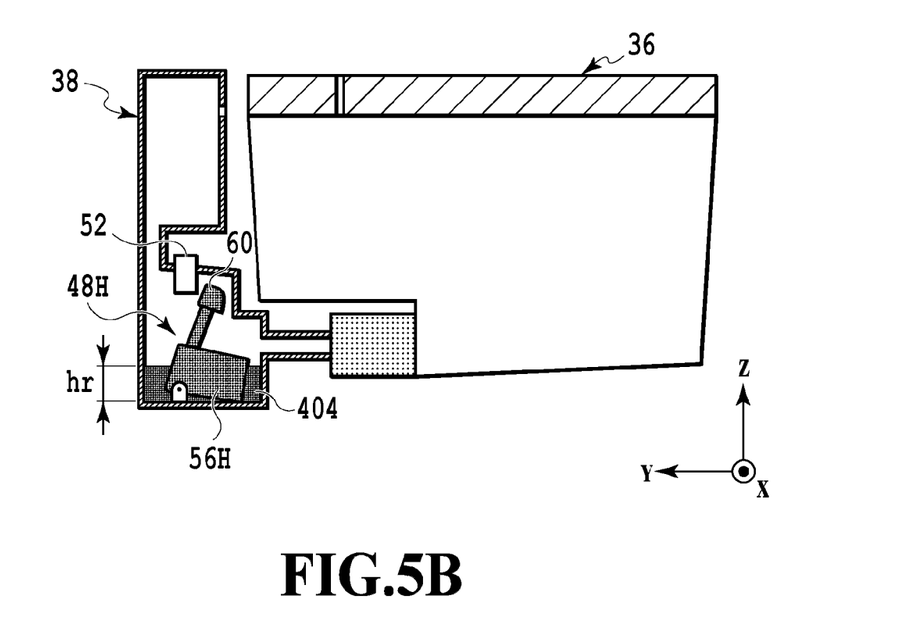

Therefore, in the present embodiment, the specific gravity of the pivot member 48, more specifically the specific gravity of the float 56 is changed according to the specific gravity of an ink. This will be described below in detail with reference to FIGS. 5A and 5B. FIGS. 5A and 5B are diagrams showing a change of specific gravity of the float according to the specific gravity of an ink; FIG. 5A shows the case of storing an ink lower in specific gravity than the reference ink and FIG. 5B shows the case of storing an ink higher in specific gravity than the reference ink.

In the ink storage chamber 38 storing the ink 402 low in specific gravity, a pivot member 48L with a float 56L low in specific gravity is used as the pivot member 48 (see FIG. 5A). The float 56L is lower in specific gravity than the float 56R of the pivot member 48R capable of appropriately detecting that the liquid surface height of the reference ink 400 becomes lower than the predetermined position. The specific gravity of the float 56L is adjusted to such a specific gravity as to appropriately detect that the liquid surface height of the ink 402 becomes lower than the predetermined position. That is, the specific gravity of the float 56L is adjusted to such a specific gravity that the detection target portion 60 gets away from the sensor 52 in a case where the liquid surface height of the ink 402 reaches the height hr. More specifically, the specific gravity of the float 56L is adjusted such that a difference in specific gravity between the ink 402 and the float 56L is equal to a difference in specific gravity between the ink 400 and the float 56R. Incidentally, the equality of the difference in specific gravity between the ink 402 and the float 56L with the difference in specific gravity between the ink 400 and the float 56R is not limited to exact equality between these differences and includes a case where they are both within a predetermined range.

In the ink storage chamber 38 storing the ink 404 high in specific gravity, a pivot member 48H with a float 56H high in specific gravity is used as the pivot member 48 (see FIG. 5B). The float 56H is higher in specific gravity than the float 56R of the pivot member 48R capable of appropriately detecting that the liquid surface height of the ink 400 becomes lower than the predetermined position. The specific gravity of the float 56H is adjusted to such a specific gravity as to appropriately detect that the liquid surface height of the ink 404 becomes lower than the predetermined position. That is, the specific gravity of the float 56H is adjusted to such a specific gravity that the detection target portion 60 gets away from the sensor 52 in a case where the liquid surface height of the ink 404 reaches the height hr. More specifically, the specific gravity of the float 56H is adjusted such that a difference in specific gravity between the ink 404 and the float 56H is equal to a difference in specific gravity between the ink 400 and the float 56R. Incidentally, the equality of the difference in specific gravity between the ink 404 and the float 56H with the difference in specific gravity between the ink 400 and the float 56R is not limited to exact equality between these differences and includes a case where they are both within a predetermined range.

Accordingly, in a case where the printing apparatus 10 is configured to use a plurality of inks different in specific gravity, each ink storage chamber 38 is provided with a pivot member 48 comprising a float 56 having a specific gravity adjusted according to the specific gravity of a stored ink. At this time, all the ink storage chambers 38 are equal to one another in a difference in specific gravity between the stored ink and the float 56 (including a case where the differences are all within a predetermined range).

As explained above, in the printing apparatus 10, the specific gravity of the float 56 in the pivot member 48 is changed according to the specific gravity of an ink stored in the ink storage chamber 38. This makes it possible to appropriately detect that the liquid surface height of an ink stored in the ink storage chamber 38 becomes lower than the predetermined position. As a result, depending on the type of ink, a notification that the ink has run out can be made at an appropriate timing after the issuance of a notification to prompt replacement of the ink accommodating member 36.

Second Embodiment

Next, a liquid ejection apparatus according to a second embodiment will be described with reference to FIGS. 6A to 6C. The following description shows an example of a printing apparatus which performs printing by ejecting ink to a print medium like the first embodiment described above. Further, a detailed description of constituents identical or corresponding to those of the printing apparatus according to the first embodiment will be omitted as appropriate by using the same reference numerals.

A liquid ejection apparatus 10 according to the second embodiment is different from that of the first embodiment in that the size of the float 56 is changed according to the specific gravity of an ink.

Figure 6A:
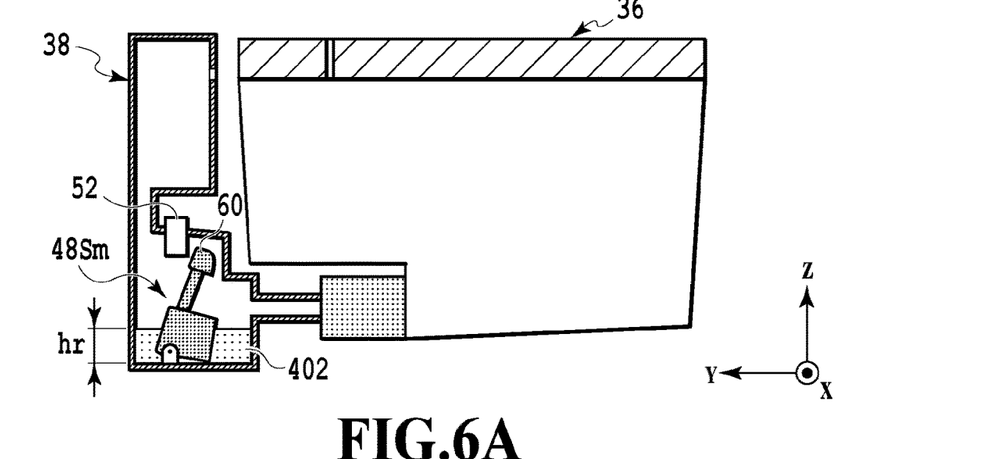
FIGS. 6A to 6C are diagrams showing other embodiments of the pivot member.
Figure 6B:
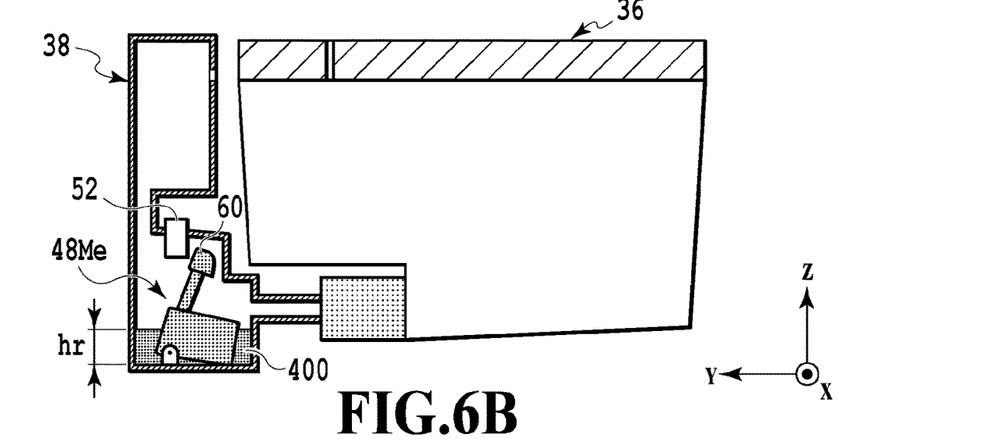
Figure 6C:
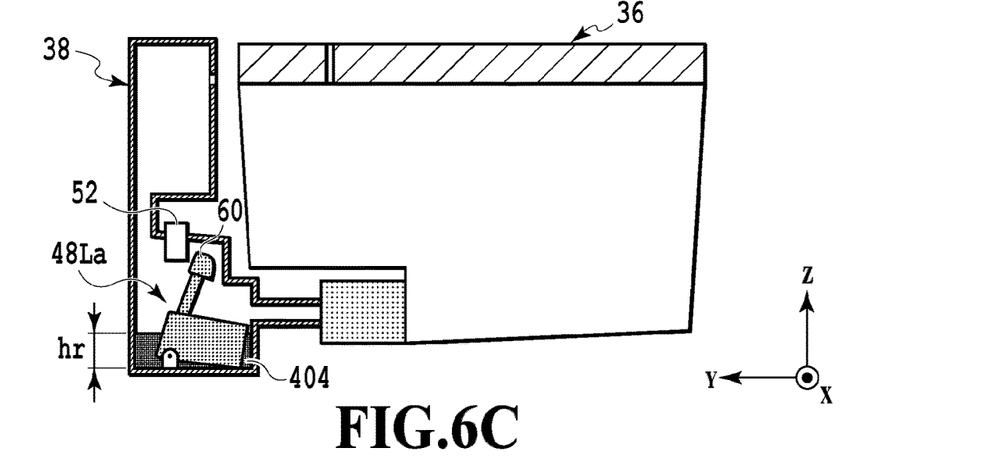

FIGS. 6A to 6C are diagrams showing a change of size of a float according to the specific gravity of an ink; FIG. 6A shows the case of storing an ink lower in specific gravity than the reference ink, FIG. 6B shows the case of the reference ink, and FIG. 6C shows the case of storing an ink higher in specific gravity than the reference ink.

In the case of using the ink 400 having the reference specific gravity, if the liquid surface Ls of the ink 400 reaches a height hr in the ink storage chamber 38, the detection target portion 60 of the pivoting pivot member 48R gets away from the sensor 52 (see FIG. 6B). At this time, the printing apparatus 10 detects that the height of the liquid surface of the ink becomes lower than the predetermined position. That is, in a case where the liquid surface height is the height hr, the buoyancy exerted on the pivot member 48R is less than the gravity acting on the pivot member 48R. In the description with reference to FIGS. 6A to 6C, it is assumed that the detection can be made appropriately at this time.

In the ink storage chamber 38 storing the ink 402 low in specific gravity, a pivot member 48Sm with a small-sized float 56Sm is used as the pivot member 48 (see FIG. 6A). The float 56Sm is smaller in size than a float 56Me of a pivot member 48Me capable of appropriately detecting that the liquid surface height of the reference ink 400 becomes lower than the predetermined position. The float 56Sm is adjusted to such a size as to appropriately detect that the liquid surface height of the ink 402 becomes lower than the predetermined position. That is, the float 56Sm is adjusted to such a size that the detection target portion 60 gets away from the sensor 52 in a case where the liquid surface height of the ink 402 reaches the height hr. More specifically, the size of the float 56Sm is adjusted such that a buoyancy experienced by the float 56Me in a case where the liquid surface height of the ink 400 is the height hr is equal to a buoyancy experienced by the float 56Sm in a case where the liquid surface height of the ink 402 is the height hr. Incidentally, the equality of the buoyancy experienced by the float 56Me in the case where the liquid surface height of the ink 400 is the height hr with the buoyancy experienced by the float 56Sm in the case where the liquid surface height of the ink 402 is the height hr is not limited to exact equality between these buoyancies and includes a case where the buoyancies are both within a predetermined range.

In the ink storage chamber 38 storing the ink 404 high in specific gravity, a pivot member 48La with a large-sized float 56La is used as the pivot member 48 (see FIG. 6C). The float 56La is larger in size than the float 56Me of the pivot member 48Me capable of appropriately detecting that the liquid surface height of the ink 400 becomes lower than the predetermined position. The float 56La is adjusted to such a size as to appropriately detect that the liquid surface height of the ink 404 becomes lower than the predetermined position. That is, the float 56La is adjusted to such a size that the detection target portion 60 gets away from the sensor 52 in a case where the liquid surface height of the ink 404 reaches the height hr. More specifically, the size of the float 56La is adjusted such that the buoyancy experienced by the float 56Me in the case where the liquid surface height of the ink 400 is the height hr is equal to a buoyancy experienced by the float 56La in the case where the liquid surface height of the ink 404 is the height hr. Incidentally, the equality of the buoyancy experienced by the float 56Me in the case where the liquid surface height of the ink 400 is the height hr with the buoyancy experienced by the float 56La in a case where the liquid surface height of the ink 404 is the height hr is not limited to exact equality between these buoyancies and includes a case where the buoyancies are both within a predetermined range.

Accordingly, in a case where the printing apparatus 10 is configured to use a plurality of inks different in specific gravity, each ink storage chamber 38 is provided with a pivot member 48 comprising a float 56 having a size adjusted according to the specific gravity of a stored ink. At this time, all the ink storage chambers 38 are equal to one another in a buoyancy acting on the float 56 (including a case where the buoyancies are all within a predetermined range).

As explained above, in the printing apparatus 10 according to the second embodiment, the size of the float 56 in the pivot member 48 is changed according to the specific gravity of an ink stored in the ink storage chamber 38. As a result, the printing apparatus 10 according to the second embodiment can produce the same advantageous result as the printing apparatus 10 according to the first embodiment.

Other Embodiments

The embodiments described above may be modified as stated in (1) to (4) below.

(1) In the above embodiments, the pivot member 48 is provided in the ink storage chamber 38, but is not limited to this. That is, the pivot member 48 may be provided in the ink accommodating member 36. In this case, the sensor 52 is provided such that the pivot member 48 provided in the ink accommodating member 36 can be detected with the ink accommodating member 36 connected to the ink storage chamber 38. In the above embodiments, only one of the specific gravity and size of the float 56 is changed according to the specific gravity of an ink, but the target to be changed is not limited to this. That is, both of the specific gravity and size of the float 56 may be changed. It is only necessary to change at least one of the specific gravity and size of the float 56 according to the specific gravity of an ink.

(2) The above embodiments are not only applied to a printing apparatus which performs printing on a print medium by ejecting ink from a print head but also universally applicable to a liquid ejection apparatus which performs various types of processing by ejecting various liquids from an liquid ejection head. In addition, the printing apparatus 10 is a so-called serial scan type printing apparatus which ejects ink from a print head moving in the X direction to a print medium conveyed in the Y direction in the above embodiments, but is not limited to this. That is, it is also possible to use a so-called full line type print head using an elongate print head covering the entire width of a print area of a print medium.

(3) In the above embodiments, the pivot member 48 and the sensor 52 are used to determine whether the liquid surface height of the ink stored in the ink storage chamber 38 is lower than the predetermined position. However, the configuration to detect the amount of ink in the ink storage chamber 38 is not limited to this. That is, a sensor capable of detecting a pivot angle of the pivot member 48 from a reference position may be provided such that the remaining amount of ink stored in the ink storage chamber 38 is gradually or continuously detected based on the pivot angle of the pivot member 48. Further, although not particularly described in the above embodiments, a printing apparatus configured to eject only an ink of a single color uses an ink storage portion 32 comprising a pivot member 48 with a float 56 of a specific gravity corresponding to the specific gravity of an ink to be ejected. Alternatively, the printing apparatus uses an ink storage portion 32 comprising a float 56 of a size corresponding to the specific gravity of the ink.

(4) The above embodiments and various forms shown in (1) to (3) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-176496, filed Oct. 28, 2021, which is hereby incorporated by reference wherein in its entirety.

What is claimed is:

1. A liquid ejection apparatus comprising:
a liquid ejection head configured to eject a liquid; and
a plurality of storage units configured to store a liquid to be supplied to the liquid ejection head,
each of the storage units comprising:
a pivot member immersed in a stored liquid and pivotally movable according to an amount of the liquid; and
a detection unit configured to detect an amount of the liquid stored in the storage unit using the pivot member,
wherein the plurality of storage units includes a first storage unit storing a first liquid and comprising a first pivot member, and a second storage unit storing a second liquid different in specific gravity from the first liquid and comprising a second pivot member, and
wherein at least one of a specific gravity and size of the second pivot member differs from that of the first pivot member.

2. The liquid ejection apparatus according to claim 1, wherein
the pivot member comprises:
a float which is lower in specific gravity than a liquid stored in the storage unit and is pivotally supported in the storage unit; and
a detection target portion which is provided on the float via an arm portion and is detectable by the detection unit,
wherein the first storage unit comprises a first float and the second storage unit comprises a second float, and
wherein at least one of a specific gravity and size of the second float differs from that of the first float according to a specific gravity of the second liquid and that of the first liquid.

3. The liquid ejection apparatus according to claim 2, wherein
based on a pivot motion of the pivot member, the detection unit detects that a height of a liquid surface of a liquid stored in the storage unit becomes lower than a predetermined position, and
the specific gravity of the float is such a specific gravity that in a case where the liquid surface becomes lower than the predetermined position, the detection unit can determine that the liquid surface becomes lower than the predetermined position.

4. The liquid ejection apparatus according to claim 3, wherein
a difference in specific gravity between the first liquid and the first float in the first storage unit is equal to a difference in specific gravity between the second liquid and the second float in the second storage unit.

5. The liquid ejection apparatus according to claim 2, wherein
based on a pivot motion of the pivot member, the detection unit detects that a liquid surface of a liquid stored in the storage unit becomes lower than a predetermined position, and
the size of the float is such a size that in a case where the liquid surface becomes lower than the predetermined position, the detection unit can determine that the liquid surface becomes lower than the predetermined position.

6. The liquid ejection apparatus according to claim 5, wherein
a buoyancy exerted on the first float by the first liquid is equal to a buoyancy exerted on the second float by the second liquid.

7. The liquid ejection apparatus according to claim 1, wherein
each of the storage units comprises:
a storage chamber configured to store a liquid; and
an accommodating member attachable to and detachable from the storage chamber and configured to accommodate a liquid to be supplied to the storage chamber, and
a liquid accommodated in the accommodating member flows into the storage chamber by mounting the accommodating member on the storage chamber.

8. The liquid ejection apparatus according to claim 7, wherein
the pivot member is provided in the storage chamber.

9. The liquid ejection apparatus according to claim 7, wherein
the pivot member is provided in the accommodating member.

10. The liquid ejection apparatus according to claim 1, wherein the specific gravity of the second pivot member differs from that of the first pivot member.

11. The liquid ejection apparatus according to claim 1, wherein the size of the second pivot member differs from that of the first pivot member.

* * * * *